(12) United States Patent
Tompkin et al.

(10) Patent No.: US 8,848,266 B2
(45) Date of Patent: Sep. 30, 2014

(54) SECURITY ELEMENT AND METHOD FOR PRODUCING A SECURITY ELEMENT

(71) Applicants: Wayne Robert Tompkin, Baden (CH); Norbert Lutz, Ruckersdorf (DE); Markus Burkhardt, Kodnitz (DE); Michael Scharfenberg, Nuremberg (DE)

(72) Inventors: Wayne Robert Tompkin, Baden (CH); Norbert Lutz, Ruckersdorf (DE); Markus Burkhardt, Kodnitz (DE); Michael Scharfenberg, Nuremberg (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 0 days.

(21) Appl. No.: 13/920,273

(22) Filed: Jun. 18, 2013

(65) Prior Publication Data

US 2014/0002873 A1    Jan. 2, 2014

Related U.S. Application Data

(62) Division of application No. 12/936,225, filed as application No. PCT/EP2009/002419 on Apr. 2, 2009, now Pat. No. 8,498,034.

(30) Foreign Application Priority Data

Apr. 4, 2008   (DE) .......................... 10 2008 017 652

(51) Int. Cl.
| | | |
|---|---|---|
| G03H 1/00 | (2006.01) | |
| G03H 1/26 | (2006.01) | |
| B42D 25/00 | (2014.01) | |
| G03H 1/28 | (2006.01) | |
| G03H 1/04 | (2006.01) | |
| G03H 1/02 | (2006.01) | |
| G03H 1/18 | (2006.01) | |
| G03H 1/20 | (2006.01) | |

(52) U.S. Cl.
CPC ........ B42D 15/10 (2013.01); G03H 2001/0415 (2013.01); G03H 2001/2635 (2013.01); G03H 1/0011 (2013.01); G03H 2270/54 (2013.01); G03H 1/0236 (2013.01); B42D 15/105 (2013.01); G03H 1/0248 (2013.01); G03H 2001/187 (2013.01); G03H 1/18 (2013.01); G03H 1/0244 (2013.01); G03H 2250/36 (2013.01); G03H 1/041 (2013.01); G03H 2210/54 (2013.01); G03H 1/28 (2013.01); G03H 2001/207 (2013.01); G03H 2001/188 (2013.01)
USPC .............................................. 359/2; 359/22

(58) Field of Classification Search
USPC .............................................................. 359/2
See application file for complete search history.

(56) References Cited

U.S. PATENT DOCUMENTS

| | | |
|---|---|---|
| 6,747,768 B1 | 6/2004 | Knocke et al. |
| 2006/0251863 A1 | 11/2006 | Katschorek et al. |
| 2009/0162756 A1 | 6/2009 | Staub et al. |

FOREIGN PATENT DOCUMENTS

DE    102006016139    10/2007
(Continued)

Primary Examiner — Jade R Chwasz
(74) Attorney, Agent, or Firm — Hoffmann & Baron, LLP

(57) ABSTRACT

A method for producing a security element (55) and a security element (55) in the form of a multilayered film body having a top side facing the observer. The security element (55) has a volume hologram layer, in which a volume hologram is recorded, which provides a first optically variable information item. The security element (55) has a replication layer, in the surface of which a relief structure providing a second optically variable information item is molded and which is arranged above the volume hologram layer. A partial metallic layer is arranged between the volume hologram layer and the replication layer, wherein the metallic layer is provided in one or a plurality of first zones of the security element and the metallic layer is not provided in one or a plurality of second zones of the security element.

24 Claims, 12 Drawing Sheets

(56) References Cited

FOREIGN PATENT DOCUMENTS

| | | |
|---|---|---|
| EP | 1187728 | 12/2003 |
| EP | 1645943 | 4/2006 |
| GB | 2232927 | 1/1991 |
| JP | S60-107902 | 6/1985 |
| JP | 2006-504545 | 2/2006 |
| JP | 2006-145688 | 6/2006 |
| JP | 2010-099929 | 5/2010 |
| JP | 2010-139910 | 6/2010 |
| JP | 2013-037029 | 2/2013 |
| RU | 2005135653 | 3/2006 |
| WO | WO03082598 | 10/2003 |

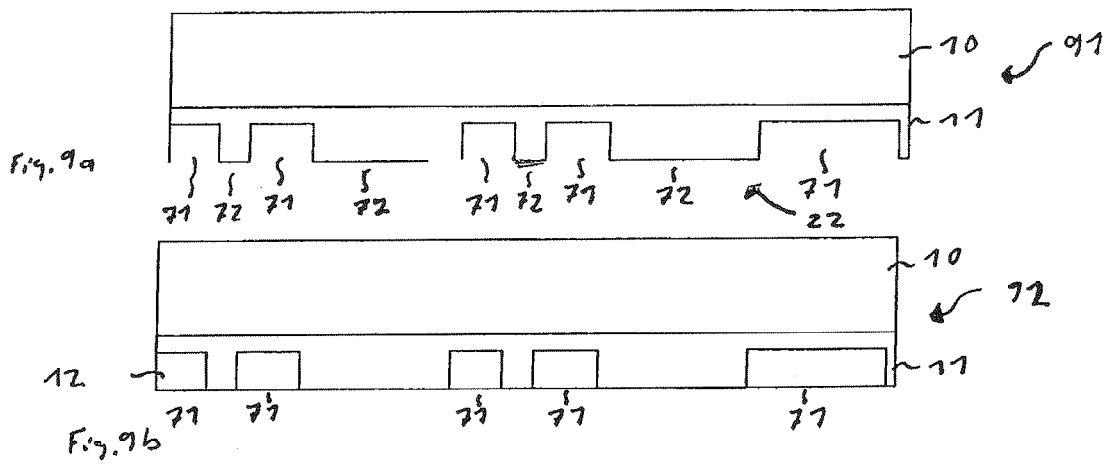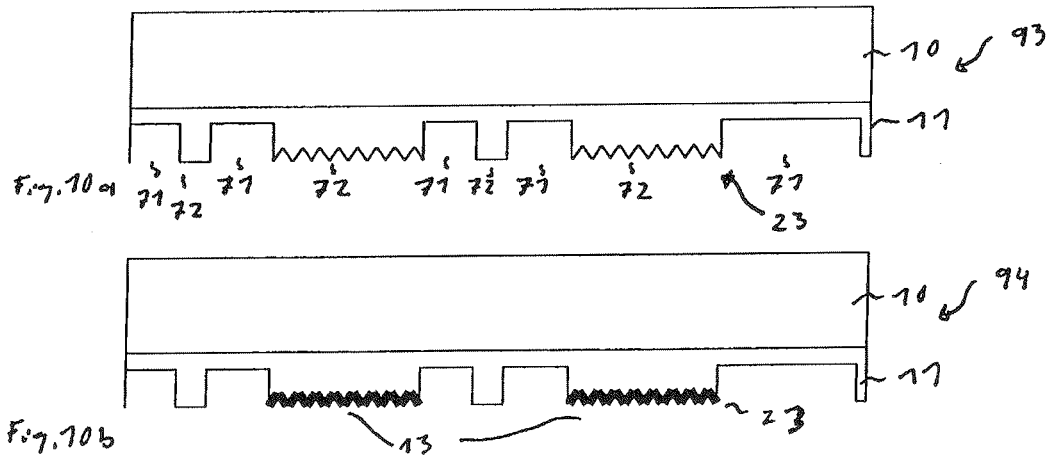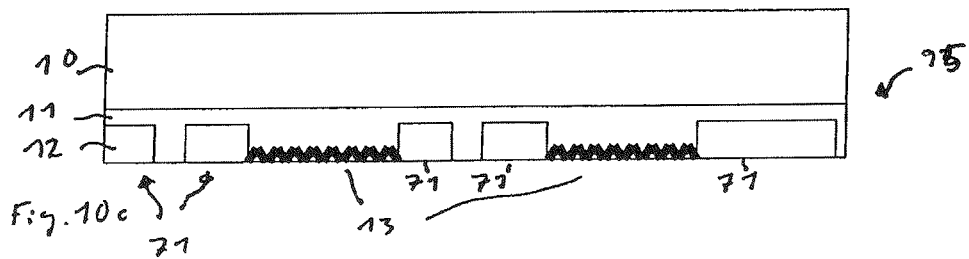

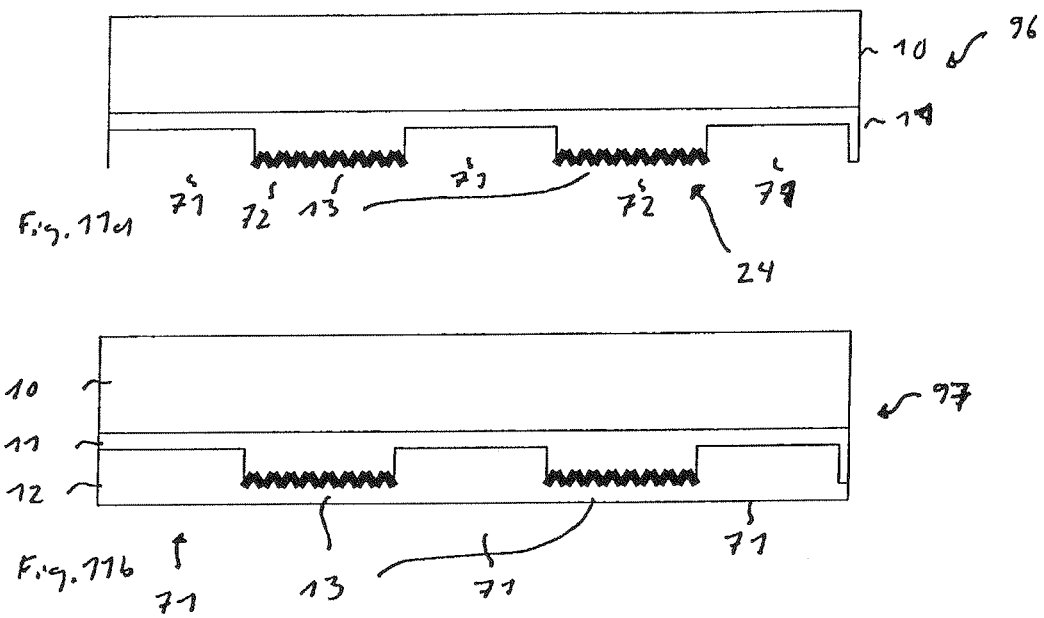

SECURITY ELEMENT AND METHOD FOR PRODUCING A SECURITY ELEMENT

This application is a divisional application of U.S. application Ser. No. 12/936,225, filed Nov. 1, 2010, which claims priority based on an International Application filed under the Patent Cooperation Treaty, PCT/EP2009/002419, filed on Apr. 2, 2009 and German Application No. DE 102008017652.4-45, filed on Apr. 4, 2008.

BACKGROUND OF THE INVENTION

The invention relates to a security element in the form of a multilayered film body having a volume hologram layer, and to a method for producing such a security element.

Holograms are used as security elements for protecting security documents such as banknotes, money substitutes, credit cards, passports or ID documents and also for product protection. In mass-produced products, surface holograms are often used, by means of which interesting optically variable effects, for example movement effects, can be obtained and which are distinguished by a high luminous intensity.

Volume holograms, also referred to as white light holograms, in contrast to surface holograms, are based on diffraction of light at the Bragg planes of a transparent layer having local differences in refractive index.

A security element comprising a volume hologram and the production of such a security element are described for example by DE 10 2006 016 139 A1. In order to produce a multilayer body containing a volume hologram, a surface relief is used as master. The front side of the master is brought into contact with the photosensitive layer of the multilayer body directly or with interposition of a transparent optical medium, in which photosensitive layer the volume hologram is intended to be recorded. Afterward, the master is exposed with coherent light, an interference pattern being formed by the superimposition of the light radiated onto the master and the light diffracted by the master, which interference pattern is recorded in the photosensitive layer as a volume hologram. The volume hologram introduced into the photosensitive layer in this way is then fixed after the curing of the photosensitive layer. By means of a specific configuration of the master, two or more separate image information items can be written into the photosensitive layer in this case.

Further, EP 1 187 728 B1 describes the lamination of two volume hologram layers one on top of the other, in which layers image information items have been written by means of different holographic recording methods. For the observer this gives rise to an overall impression composed of the image information items of the two volume hologram layers.

SUMMARY OF THE INVENTION

The invention is based on the object, then, of specifying an improved security element and a method for producing said security element.

The object of the invention is achieved by a security element in the form of a multilayered film body having a top side facing the observer, which security element has a volume hologram layer in which a volume hologram is recorded, which provides a first optically variable information item, which security element has a replication layer, in the surface of which a relief structure providing a second optically variable information item is molded and which is arranged above the volume hologram layer, and wherein a partial metallic layer is arranged between the volume hologram layer and the replication layer, wherein the metallic layer is provided in one or a plurality of first zones of the security element and the metallic layer is not provided in one or a plurality of second zones of the security element. The object is furthermore achieved by a method for producing a security element in the form of a multilayered film body having a top side facing the observer, wherein a multilayer body comprising a partial metallic layer and a replication layer is provided, wherein a relief structure providing a second optically variable information item is molded in a surface of the replication layer and the metallic layer is provided in one or a plurality of first zones of the security element and the metallic layer is not provided in one or a plurality of second zones of the security element, wherein a volume hologram layer is applied on that surface of the film body which lies closer to the metallic layer than to the replication layer, such that the partial metallic layer is arranged between the volume hologram layer and the replication layer, and in that the volume hologram layer is exposed with coherent light from that side of the multilayer body which faces away from the volume hologram layer, through the partial metallic layer, for the purpose of recording a volume hologram in the volume hologram layer.

The invention provides a security element which can be counterfeited only with great difficulty and can nevertheless be manufactured in an expedient manner. By virtue of the arrangement of the partial metallic layer between the volume hologram layer and the replication layer, in which the relief structure is molded, on the one hand the optical effect of the domains of the volume hologram layer which lie below the metallic layer in the first zones is suppressed, and on the other hand the optical effect of the relief structure is caused to be manifested in these zones. A seamless transition of the different optical effects generated in the first and second zones is thus brought about, without the volume hologram layer and the relief structure having to be partially applied in a registered fashion with respect to one another. As a result, the first and second information items are generated in an undistorted manner and with high luminous intensity in domains lying alongside one another with register accuracy, as a result of which a brilliant and impressive optically variable overall impression arises for the observer. Moreover, this impression cannot be imitated by an optical copying method since the optically variable effect produced by the volume hologram layer, on the one hand, and the optically variable effect produced by the replication layer with the metallic layer situated beneath it, on the other hand, in each case cannot be imitated by means of the respective other technology, and the structures generating the first and the second optically variable information items thus mutually protect one another against counterfeiting. Furthermore, an intimate connection of the structures providing the first and second information items is obtained by means of the sequence of the layers, such that the attempt to manipulate one structure automatically influences the optical impression of the other structure, such that any attempt at manipulation is immediately recognizable. Moreover, in the method according to the invention an intimate connection of the layers is obtained by virtue of the fact that the volume hologram is written in the volume hologram layer through the partial metallic layer and the partial metallic layer thus furthermore also produces the function of an exposure mask for writing the volume hologram. Thus, firstly, subsequent separation of the layers is made more difficult and, secondly, such an attempt at manipulation is immediately recognizable since the volume hologram layer has domains in which no volume hologram is written into the layer.

Further advantageous embodiments of the invention are presented in the dependent claims.

It is particularly advantageous for the relief structure to be molded into the underside of the replication layer and for the partial metallic layer to be arranged directly between the replication layer and the volume hologram layer. In the first zones, the first surface of the metallic layer thus adjoins the replication layer and the second surface of the metallic layer, lying opposite the first surface, adjoins the volume hologram layer. In the second zones, the replication layer furthermore adjoins the volume hologram layer.

The volume hologram layer thus directly adjoins the metallic layer in the first zones and directly adjoins the replication layer in the second zones, such that subsequent separation of the volume hologram layer is possible only with difficulty on account of the adhesive bridges thus formed in the second zones. Moreover, a detachment attempt can be recognized, on account of the different adhesion behavior and adhesion forces in the first and second zones, directly from the resultant surface pattern.

It is particularly advantageous in this case to choose the difference in refractive index between the material of the replication layer and the material provided at the top side of the volume hologram layer, in particular by selection of the material used for the replication layer, to be less than 0.2, preferably to choose the refractive index of these materials to be approximately identical. What is achieved thereby is that, during the application of the volume hologram layer, the surface structures molded into the underside of the replication layer in the second zones are filled with a transparent material having a similar refractive index, namely the material of the volume hologram layer, and the optical effect of these structures is thus cancelled. This affords the advantage, firstly, that registration of the processes that mold the relief structure and the replication layer and of the processes that structure the metallic layer does not have to be effected. Furthermore, it is thus ensured that possible relief structures molded in the replication layer in the domain of the second zones do not lead to distortions or corruptions of the recording result when the volume hologram is written into the volume hologram layer. It is thus possible, for example, for a surface relief to be molded into the replication layer over the whole area and for the optically variable information that arises for the observer only to be defined in a second step, for example by the individualization of the metallic layer by means of a laser. Subsequent alteration of this information by subsequent processing of the metallic layer by means of a laser after the recording of the volume hologram can be recognized directly in this case since, in the case of the volume hologram written in accordance with the method according to the invention, this volume hologram is present only in certain domains in the volume hologram layer and, consequently, such an attempt at manipulation can be recognized directly.

Depending on materials used for the replication layer and the volume hologram layer adjoining one another, it may be advantageous from case to case to arrange an adhesion promoter layer between the replication layer and the volume hologram layer, the task of which adhesion promoter layer is to intensify the adhesion of these two layers to one another or to establish adhesion between replication layer and adhesion promoter layer and between volume hologram layer and adhesion promoter layer which is stronger than direct adhesion between the replication layer and the volume hologram layer. In this case, the adhesion promoter layer has a refractive index which differs by less than 0.2 from the refractive index of the material of the replication layer and the refractive index of the material provided at the top side of the volume hologram layer. As a result, the adhesion promoter layer does not produce any disturbing, in particular optical, effects during production or during later use of the security element.

Furthermore, it is also possible for an individualization of the security element to be carried out by overprinting or by perforating a plurality of layers of the security element. Thus, it is possible, for example, to apply on the top side of the security element, said top side facing the observer, an individualizing imprint that preferably extends over a zone boundary between one or a plurality of first zones and one or a plurality of second zones. In this case, it is particularly advantageous for the application of individualization information to be carried out by means of intaglio printing since, by this means, the relief structure molded in the replication layer and also the volume hologram layer are deformed by the pressure applied and are lastingly altered in terms of their optical properties. The introduction of microperforations extending through at least the replication layer and the volume hologram layer also leads to a lasting and irreversible alteration of the layers that generate the optical effects. As a result, it is no longer possible to subsequently change the individualized information for example by detachment or removal of an overprint and attempts at manipulation become immediately recognizable.

In accordance with one preferred embodiment of the invention, the one or the plurality of first zones or the one or the plurality of second zones are shaped in pattern form for the purpose of forming a third information item. Thus, by way of example, the first or the second zones form pattern domains representing, for example, a portrait, a logo, a guilloche or an alphanumeric information item against a background domain formed by the second and/or first zones. In this case, it is particularly advantageous to shape the first and/or second zones in the form of thin lines having a line width of <300 μm, preferably <150 μm, and, by means of such lines, to shape for example a guilloche or some other item of information recognizable to the human observer, for example a portrait.

In accordance with a further preferred exemplary embodiment of the invention, first and second zones are provided alternately in a first domain of the security element, and in this case first zones succeeding one another in at least one direction are spaced apart from one another by less than 300 μm. What is thereby achieved is that, in the first domain, the first and second optically variable information items appear to the human observer in one and the same domain and an optically variable impression that is particularly succinct and very difficult to counterfeit arises for the human observer in the first domain. It is thus possible to generate totally new color and movement effects for the human observer in the first domain as a security feature, which effects can be provided neither by a volume hologram nor by a surface hologram as such.

Preferably, the ratio of the average width of the first zones to the ratio of the average width of the second zones in the first domain is between 0.75:1 and 1:5. Thus, by way of example, preferably the width of the first zones is chosen to be less than 120 μm and the width of the second zones is chosen to be greater than 120 μm. Investigations have shown that when the width of the first and second zones is chosen in such a way, an optically variable impression that arises for the human observer in the first domain is particularly clear and of high luminous intensity.

Preferably, the first and second zones are arranged in accordance with a regular, one- or two-dimensional grid, for example a line grid or an area grid. In this case, the form of the first and second zones can also be substructured further, for example have the form of alphanumeric numbers or of symbols, such that a further security feature that is only recognizable by means of an aid is thereby provided. If an area grid is chosen, then the first zones and/or second zones are preferably shaped in punctiform fashion or in the form of a polygon. Furthermore, it is also possible for the one- or two-dimensional grid to be a geometrically transformed grid, for example a circularly or undulately transformed one-dimensional grid, such that, by way of example, the first zones are provided in the form of concentric annuli or in the form of undulating lines in the first domain.

In accordance with a further preferred embodiment of the invention, the first domain has a smallest dimension of more than 300 µm and is shaped in pattern form for the purpose of forming a fourth information item. The above-depicted superimposed optically variable impression that arises in the first domain is thus provided for example in a cross-shaped domain or in a portrait-forming domain, as a result of which further interesting and catchy optically variable effects can be obtained.

The relief structure molded in the replication layer is preferably a relief structure with dimensioning <50 µm, for example a diffraction grating having a spatial frequency of 100 to 3500 lines/mm, a hologram, a zeroth-order diffraction structure, a blaze grating, a Kinoform, a preferably anisotropic matt structure or an isotropic matt structure, a refractive structure, for example a lens structure, for example a microlens structure, a blaze grating or a prismatic structure, or a combination of one or more of the relief structures mentioned above. Furthermore, it is possible for the relief structure to be molded into the replication layer over the whole area or merely into partial domains of the replication layer, preferably to be molded into the replication layer only in the domain of the first zones.

The metallic layer preferably consists of aluminum, silver, gold, copper, chromium, $SiO_x$, or of an alloy of these materials. The layer thickness of the metallic layer is preferably 0.1 to 100 nm, wherein the layer thickness of the metallic layer is preferably chosen such that the degree of opacity of the metallic layer is more than 40% to 50%, preferably more than 80%.

In accordance with one preferred exemplary embodiment of the invention, two or more information items from the group of first, second, third and fourth information items represent mutually complementary information items. Thus, by way of example, partial motifs of an overall motif are respectively formed by the first and second optically variable information items. By way of example, the second information item forms leaves of a tree represented by the first information item. As a result, what is furthermore achieved is that any manipulation of one of the layers of the security element, even a very slight manipulation, immediately becomes intuitively recognizable to the human observer.

Furthermore, it is also possible for first, second, third and fourth information items to be provided in a manner lying alongside one another or overlying one another in the security element. Thus, it is possible, for example, to shape first zones in the form of an image, for example of a flower pattern, in a first domain (third information item), to arrange first and second zones in accordance with a grid in a second domain in pattern form (fourth information item) and to shape the first zones in the form of a thin line, producing a pictorial representation, preferably having a line width of less than 120 µm, in a third domain. These domains can also overlie one another in part. Furthermore, it is also possible to provide first zones having a line width of less than 50 µm in further domains, for example to shape the first zones in the form of a microtext.

In accordance with one preferred exemplary embodiment of the invention, the volume hologram master is arranged below the volume hologram layer in direct contact with the volume hologram layer or in a manner separated from the volume hologram layer by an optical medium. In this case, the volume hologram master used is preferably a volume hologram master which has an optically variable surface relief and which is provided with a reflection layer. It is also possible, however, to use instead of a surface relief as volume hologram master also a volume hologram, as is the case in traditional recording technology for volume holograms wherein a volume hologram master is used for recording a volume hologram. A combination of a surface relief master and a volume hologram master can also be used during the recording of the volume hologram. Furthermore, it is also possible for the volume hologram master to be arranged on the side facing away from the volume hologram layer and for the coherent light used for the recording of the volume hologram to pass through a volume hologram master arranged in this way or to be reflected by a volume hologram master arranged in this way before it passes through the replication layer and the partial metal layer in order to expose the volume hologram layer. In this case the reference beam is preferably radiated in from the opposite side, that is to say from the side facing the volume hologram layer, onto the volume hologram layer for the purpose of forming the interference pattern.

The color of the volume hologram recorded in the volume hologram layer is preferably determined by the wavelength of the light used for the exposure, by the angle of incidence of the light used for the exposure, by the diffraction behavior of the volume hologram master, in particular by the latter's surface relief, grating period or azimuth angle, and by the photopolymer, the curing process for the photopolymer, and an optional treatment of the photopolymer for shrinkage or swelling of the volume hologram layer.

For the purpose of producing multicolor volume holograms it is thus possible, for example, to shrink or to swell the volume hologram layer in certain domains by means of different curing processes or different aftertreatments in certain domains, and thus to generate domains in which the volume hologram of the volume hologram layer exhibits a different color.

In accordance with one preferred embodiment of the invention, the following method is carried out for producing multicolor volume holograms:

Two or more lasers are used for the exposure of the volume hologram layer. In this case, it is possible, firstly, for the volume hologram layer to be exposed by the light beams generated by the respective lasers at a different angle of incidence, such that each of the lasers generates an image domain of the volume hologram which has a different color value. Furthermore, it is also possible for the lasers to emit light having different wavelengths and thus for image domains having different color values to be recorded in the volume hologram layer by means of the respective lasers. In this case, it is particularly advantageous if the light generated by the two or more lasers is coupled by means of a coupler in a light beam used for recording the volume hologram in the volume hologram layer. The methods described above can also be combined with one another.

For the purpose of generating a multicolor volume hologram with image domains having different color values, the procedure adopted in this case is preferably as follows:

The lasers, a modulator arranged in the beam path between the respective laser and the volume hologram layer and/or a deflection element determining the angle of incidence of the exposure beams are correspondingly driven such that the respective image domain that is to have a predefined color value is exposed with a light having an exposure wavelength and/or light which impinges at an angle and which brings about recording of a volume hologram image domain with the predefined color value. Furthermore, it is also possible in this case to arrange exposure masks in the beam path between the two or more lasers and the volume hologram layer, which determine the position and shaping of the image domains recorded by the respective laser.

Preferably, in this case, the two or more lasers, the modulators and/or the deflection elements are driven in this case by a control unit, which determines the position of the volume hologram master with respect to the lasers by means of a position sensor, for example, and controls a register-accurate exposure of the volume hologram master by means of the two or more lasers for the purpose of generating the multicolor volume hologram. Consequently, it is possible for different domains of the volume hologram master, which can each have different diffractive structures (for example with differences in terms of the structure profile, azimuth or line spacing), to be exposed with laser light having different parameters (e.g. angle of incidence, wavelength or polarization).

The object of the invention is furthermore achieved by a security element in the form of a multilayered film body having a top side facing the observer and having a volume hologram, wherein the security element has a replication layer, in the surface of which a relief structure is molded, which has one or a plurality of first regions having a relief depth of the relief structure of more than 10 µm, preferably more than 15 µm, and has one or a plurality of second regions having a relief depth of the relief structure of less than 2 µm, in particular less than 1 µm, and wherein the first regions of the replication layer are filled with a volume hologram material, in which the volume hologram is recorded, which provides a first optically variable information item. The object is furthermore achieved by a method for producing a security element in the form of a multilayered film body having a top side facing the observer, wherein a multilayer body comprising a replication layer is provided, in the surface of which a relief structure is molded, which has one or a plurality of first regions having a relief depth of the relief structure of more than 10 µm and one or a plurality of second regions having a relief depth of the relief structure of less than 2 µm, in particular less than 1 µm, wherein the first regions of the replication layer are filled with a volume hologram material, and the volume hologram material is exposed in the first regions for the purpose of recording a volume hologram.

The recording of the volume hologram is effected by means of a volume hologram master. Afterward, the volume hologram material is cured and the volume hologram is thus fixed. With regard to these process steps, reference is made to the above explanations, which are correspondingly applicable to this exemplary embodiment, too, and can preferably be correspondingly combined with this exemplary embodiment.

The procedure described above makes it possible to influence the optical appearance of a volume hologram such that the latter cannot be imitated by an optical copying method and a security element which can be counterfeited only with difficulty and which is distinguished by novel optically variable effects is thus provided. By virtue of the fact that, in the first regions, the relief structure with a relief depth of more than 10 µm, preferably of more than 15 µm, is molded into the replication lacquer layer, a distinctly different optical impression in the first and second regions arises even when the volume hologram material is applied over the whole area both in the first and in the second regions and when a volume hologram is subsequently recorded into the volume hologram layer. In particular, what is brought about with suitable selection of the application weight of the volume hologram material (even in the case of whole-area application) is that the volume hologram, after exposure and curing, is generated only in the first regions, but not in the second regions. This can be used, for example, for additionally modulating the brightness of the volume hologram as it appears to the observer, and thus for introducing additional grey-scale information into the optically variable appearance manifested to the observer. Furthermore, it is also possible, however, for optically variable effects which are generated by a volume hologram and optically variable effects which are brought about by a surface relief structure thereby to be realized in an aligned manner with register accuracy with respect to one another in a security element.

In this case, the relief depth of the relief structure should be understood to mean the difference between the layer thickness of the replication layer at its thickest location and the layer thickness of the replication layer at the local location respectively under consideration.

Preferably, the layer thickness with which the volume hologram material is provided in the first regions differs from the layer thickness with which the volume hologram material is provided in the second regions by at least 8 µm, with further preference by at least 15 µm. The layer thickness of the volume hologram material in the second domains is preferably less than 5 µm, and the layer thickness of the volume hologram material in the first domains is more than 10 µm, preferably more than 15 µm.

The replication layer can in this case also consist of a carrier film or comprise a plurality of layers.

In accordance with one preferred exemplary embodiment of the invention, a liquid volume hologram material is applied to the multilayer body comprising the replication layer, for example by being poured on, sprayed on or printed on.

In this case, the volume hologram material is preferably applied in preferably liquid form, that is to say with a dynamic viscosity of between approximately 0.001 N*s/m$^2$ and approximately 50 N*s/m$^2$. Preference is given to a low-viscosity volume hologram material having a low viscosity of, for example, approximately 0.001 N*s/m$^2$, which corresponds to an approximately aqueous consistency, which fills the relief structure well.

Preferably, the volume hologram material applied in liquid form is wiped away by means of a doctor blade, such that the volume hologram material completely fills the relief structure in the first regions and the volume hologram material is not present, or is present only with a small layer thickness, preferably with a layer thickness of less than 5 µm, in the second regions. The use of a doctor blade can also be dispensed with if the volume hologram material is applied to the multilayer body with correspondingly low viscosity and the application weight is chosen such that the layer thickness of the volume hologram layer in the first regions and that in the second regions differ by at least 10 µm. However, the volume hologram material can also have a high viscosity, that is to say be present for example with honey-like or paste-like viscosity, which then necessitates processing by means of a doctor blade, such that the volume hologram material completely fills the relief structure in the first regions and the volume hologram material is not present, or is present only with a small layer thickness, preferably with a layer thickness of less than 5 µm, in the second regions.

In accordance with one preferred exemplary embodiment of the invention, the relief structure has, in the second regions or in partial regions of the second regions, structure elements providing a second optically variable information item. The relief structure thus has a fine structure having a relief depth of less than 1 μm in the second regions or in partial regions of the second regions and valleys of a coarse structure having a relief depth of more than 10 μm in the first regions, wherein the fine structures determine the information content of the second optically variable information item and the coarse structures define the domains in which ultimately the volume hologram manifests an optical effect. Since the fine structures and the coarse structures are molded in a single replication step, the domains in which the first and second optically variable information items can be generated are arranged with absolute register accuracy with respect to one another, that is to say practically without deviation from the arrangement or positioning of the domains relative to one another on the common volume hologram master. Furthermore, an intimate connection of the structures that provide the first and second information items is obtained thereby, such that, as already described above, the attempt to manipulate one structure automatically influences the optical impression of the other structure and, consequently, any attempt at manipulation is immediately recognizable.

The structure elements provided in the second regions or the partial regions of the second regions preferably form a diffractive structure, for example a hologram or a Kinegram®, a matt structure, a linear or crossed diffraction grating, isotropic or anisotropic matt structures, blaze gratings, zeroth-order diffraction gratings, or combinations of such diffractive structures, or a refractive structure, or a macrostructure, and are preferably formed in the manner described above. Preferably, the second regions or partial regions of the second regions are furthermore provided with a reflection layer, in particular an opaque metallic layer, such that, for example, the security element has a metallic layer which is provided in the second regions or in partial regions of the second regions and is not provided in the first regions. The metallic layer in the second regions can be provided either over the whole area there or partially. The metallic layer can also be provided as a regular or irregular, partial or whole-area grid. Preferably, the metallic layer is arranged partially and with register accuracy with respect to the design of the diffractive structures in the second regions.

Instead of the metallic layer, a nonmetallic reflection layer can also be provided, e.g. an opaque lacquer having preferably a high difference in refractive index with respect to the material of the structure elements. A nonmetallic, transparent reflection layer composed of an HRI material having a high refractive index (HRI), can also be provided.

With appropriate selection of the optical refractive indices of the replication layer and of the volume hologram material (difference in refractive index greater than approximately 0.2, preferably greater than 0.5) and/or with appropriate application of a (whole-area) reflection layer to the multilayer body after application of the volume hologram material, said reflection layer can also be dispensed with.

In this case, it has proved to be particularly advantageous to apply a reflection layer by means of the method described below in the second regions of the replication layer:

It is thus possible, for example, to provide the surface of the multilayer body having the relief structure with a thin metal layer before the application of the volume hologram material and then to utilize the different relief depth of the relief structure in the first and second regions for the register-accurate demetallization of said metal layer in the first regions. It is thus possible, for example, to apply an etching resist by printing, in which case the inking by means of the printing roller takes place only on the elevated second regions, but not on the distinctly recessed first regions. Afterward, the metal layer is removed in the domains not covered with the etching resist layer, that is to say the recessed first regions, in an etching process. Furthermore, it is also possible for an etchant to be introduced by doctor blade into the depression, that is to say into the first zone, and to bring about the removal of the metal layer there.

In accordance with one preferred exemplary embodiment of the invention, the area proportion constituted by the first regions in the area of at least one first domain of the security element differs from the area proportion constituted by the first regions in the area of at least one second domain of the security element. This has the effect that the luminous intensity of the volume hologram differs in the first domain and in the second domain. Through appropriate choice of the area proportions constituted by the first region, it is thus possible to set the brightness of pixels of the volume hologram and to modulate additional "grey-scale information" onto the volume hologram.

Preferably, the first regions for this purpose have a smallest dimension of less than 400 μm preferably of less than 200 μm. This has the effect that the splitting into first and second regions can no longer be resolved by the human observer and a continuous image impression thus arises. The smallest dimensions of the first regions preferably have a smallest dimension of more than 20 μm in order to ensure reliable filling of the first regions with the volume hologram material.

Furthermore, it is possible to bring about the brightness value of the volume hologram by varying the distance between the first regions and/or by varying the area occupied by the respective first region. It is possible to arrange the first regions in a one- or two-dimensional grid and to choose the grid width and/or the area occupied by the respective first regions to be correspondingly different in the first/second domains. The first and second regions can be configured in accordance with the first and second zones described above.

Furthermore, it is also possible for the partial regions of the second regions or the second regions to be shaped and formed in accordance with the first zones described above, and for the domains which are assigned to the second zones described above to have first and second regions.

BRIEF DESCRIPTION OF THE DRAWINGS

The invention is illustrated by way of example below on the basis of a plurality of exemplary embodiments with the aid of the accompanying drawings.

FIG. 9a and FIG. 9b show schematic sectional illustrations of a film body for a further exemplary embodiment of the invention.

FIG. 10a to FIG. 10c show schematic sectional illustrations of a film body for a further exemplary embodiment of the invention.

FIG. 11a and FIG. 11b show schematic sectional illustrations of a film body for a further exemplary embodiment of the invention.

DETAILED DESCRIPTION OF THE INVENTION

Figure 1A:
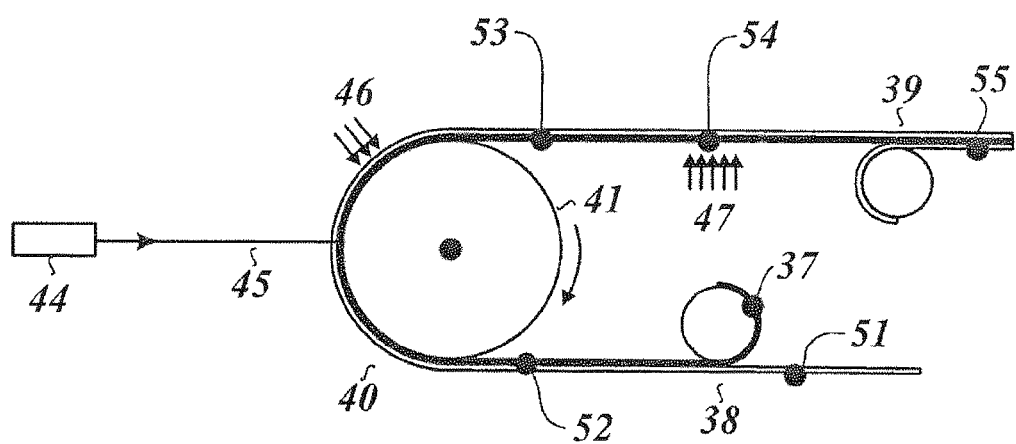
FIG. 1a to FIG. 1c show in each case a schematic illustration of a method sequence in accordance with the method according to the invention for producing a security element.

FIG. 1a illustrates the procedure when producing a security element according to the invention. FIG. 1a shows a coating station 38, an exposure station 40, an exposure station 47 and a coating station 39. A film body 51 is fed to the coating station 38. A volume hologram layer is applied on the film body 51 by the coating station 38, for example by a surface of the film body 51 being coated over the whole area or partially with a photopolymer material 37, which forms the volume hologram layer, by printing, spraying or pouring. The resultant multilayer body 52 is subsequently fed to the exposure station 40, where, for the purpose of recording a volume hologram into the volume hologram layer, it is exposed with coherent light 45 from the laser 44 and subsequently irradiated by the UV light source 46. The resultant multilayer body 53 is fed to the exposure station 47 in order to achieve complete curing of the volume hologram layer. The resultant multilayer body 54 is fed to the coating station 39, by which one or a plurality of further layers are applied to the multilayer body 54. Thus, by way of example, an adhesive layer is applied to a surface of the multilayer body 54 over the whole area by the coating station 39, thus resulting in the multilayer body 55.

Figure 2:
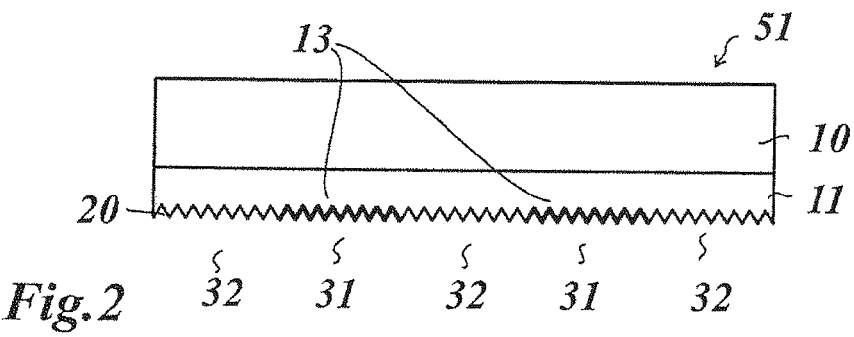
FIG. 2 shows a schematic sectional illustration of a film body provided for carrying out the methods according to FIG. 1a to FIG. 1c.

The detailed sequence of the method illustrated in FIG. 1a is explained below with reference to the following figures:

FIG. 2 shows the multilayer body 51. The multilayer body 51 has a transparent carrier film 10 and a replication layer 11. The carrier film 10 is a preferably biaxially oriented plastic film having a layer thickness of between 15 and 100 μm, preferably between 16 and 30 μm. By way of example, the carrier film is a PET, PEN or BOPP film.

The replication layer 11 is preferably applied to the carrier film 10 in a layer thickness of 0.1 to 25 μm, preferably approximately 20 μm. The replication layer consists of a thermoplastic, that is to say thermally curable and/or thermally dryable, or UV-curable replication lacquer or of a replication lacquer comprising thermoplastic and UV-curable components. As an alternative thereto, the carrier film itself 10 can also serve as a replication layer, that is to say that the relief structure 20 can be molded directly in the carrier film 10. A separate replication layer composed of replication lacquer is then no longer necessary, as a result of which the thickness of the security element can be reduced. Furthermore, it is also possible for the replication layer to consist of the carrier film 10 and a replication lacquer layer, wherein, depending on the relief depth, the relief structure extends into the replication layer or into the carrier layer, that is to say that the replication lacquer layer is through-embossed in the domain of the deep structures. A relief structure 20 is molded into the underside of the replication layer 11 over the whole area. For example by means of a heated embossing tool by which the relief structure 20 is molded by means of heat and pressure into the replication layer 11 formed by a thermoplastic replication lacquer. Furthermore, it is also possible for the relief structure 20 to be molded into the underside of the replication layer 11 by means of UV replication, by a procedure in which the replication layer 11, after the molding of the surface relief by means of a correspondingly shaped countermold, is irradiated with UV light and cured. Furthermore, it is also possible for the relief structure 20 to be introduced into the surface of the replication layer 11 by means of a laser or some other ablative method.

The relief structure 20 is a diffractive, optically variable surface structure, for example a hologram, a preferably sinusoidal diffraction grating, an asymmetrical relief structure, a blaze grating, a preferably anisotropic or isotropic, holographically produced matt structure, a Kinegram®, a computer generated hologram, or a combination of such fine relief structures having a diffraction-optical effect, the structure sizes of which are approximately in the size range of the wavelengths of visible light, that is to say approximately in the range of below 1000 nm.

Preferably, the distance between adjacent local maxima is in this case less than 50 μm, such that higher diffraction orders are suppressed and a distinctly perceptible optically variable impression is provided by the relief structure 20. Furthermore, it is also possible for the relief structure to be formed by a zeroth-order diffraction grating, wherein the distances between adjacent structure elements are in the range of or less than the wavelength of light visible to the human observer. Furthermore, it is also possible for the relief structure 20 to be formed by macroscopic structures having a refractive effect, for example microprisms or lens-type structures or binary, rectangular structures, the local distance between which can be in the range of up to a few mm, preferably up to 500 μm. Preferably, the structure dimensions are less than 40 μm. The relief structure 20 can also be formed by a combination, for example area domains arranged alongside one another, composed of macroscopic structures having a refractive effect and microscopic structures having a diffractive effect, or composed of a superimposition of macroscopic structures having a refractive effect with microscopic structures having a diffractive effect. Diffractive and refractive structures can be molded in the replication layer 11 simultaneously by means of one and the same embossing tool, such that an exactly register-accurate arrangement of both structures with respect to one another can be effected. Thus, diffractive and refractive structures can be present alongside one another in separate domains or else in common domains, for example in a manner interlaced in one another.

In this case, the distance between the local maxima of the relief structure 20 or the local periodicity of the relief structure 20 is chosen independently of the periodicity of a grid formed by first and second domains and of the width of the first or second domains.

A partial metallic layer 13 is furthermore applied to the replication layer 11, wherein the metallic layer 13 is provided in first zones 31 of the multilayer body 51 and is not provided in second zones 32 of the multilayer body 51, as is illustrated by way of example in FIG. 2. The metallic layer 13 preferably consists of aluminum, copper, gold, silver, chromium or $SiO_x$ or an alloy of these materials and preferably has a thickness of 0.1 to 100 nm.

In order to produce the partial metallic layer 13, in this case the underside of the replication layer 11 is coated with a metallic layer preferably over the whole area and when the metallic layer is subsequently removed again in the zones 32, for example by positive/negative etching or by means of ablation. In this case, it is possible, in particular, to remove the metallic layer by means of a laser in the zones 32, in order thus to obtain an individualization of the security element to be produced. Furthermore, it is also possible for the metallic layer to be applied to the replication layer 11 only in certain domains and, under certain circumstances, already in pattern form, for example by means of vapor deposition masks. A combination of the above-described demetallization and ablation methods is also possible in order, for example, to introduce an individualizable information item, for example a consecutive number, only into a partial domain.

Furthermore, it is also possible for the multilayer body 51 additionally to have one or a plurality of further layers alongside the layers shown in FIG. 2. It is thus possible, for example, for the multilayer body 51 additionally to have one or a plurality of further layers between the carrier layer 10 and the replication layer 11 in order, for example, to make available a transfer film, for example a hot embossing film, as end product. In this case, the film body 51 preferably additionally has a release layer and a protective lacquer layer, which are provided between the carrier layer 10 and the replication layer 11. Furthermore, it is also possible for the multilayer body 51 additionally to have one or a plurality of further decorative layers, for example additionally to have one or a plurality of colored lacquer layers.

A polymer that forms a volume hologram layer is then applied on the underside of the multilayer body 51 in a first step. This is effected by means of a printing method, for example, preferably by means of smearing methods. In this case, the photopolymer is applied to the underside of the multilayer body 51 preferably in a layer thickness of 5 to 100 μm, with further preference in a layer thickness of approximately 20 μm. This gives rise to the multilayer body 52 shown in FIG. 3, said multilayer body furthermore having a volume hologram layer 12 alongside the layers 10, 11 and 13 already explained with reference to FIG. 2.

In the case of a volume hologram layer 12 that is to be produced only partially, the film body 51 can have a macroscopic and/or microscopic surface profile preferably having a depth of approximately 10 to 50 μm, particularly preferably approximately 15 to 20 μm. After the preferably whole-area application of the photopolymer material 37 by printing, spraying or pouring, the photopolymer material 37, by means of a doctor blade, for example, is pressed to an even greater extent into the deep structures and is at least substantially removed from the surface of the film body 51 outside the depressions, thus giving rise to surface regions on the film body 51 which are covered with photopolymer material 37 and adjoining surface regions which are to the greatest possible extent free of, or not covered by, photopolymer material 37. This will be explained further below in detail with reference to FIGS. 9*a* to 11*b*.

The photopolymer used for the volume hologram layer 12 is, for example, the photopolymer Omni DEX 706 from Dupont. Furthermore, it is also possible to use photopolymers which are present as a liquid substance and are polymerized and thereby cured for example by the action of UV light. Provision can also be made for applying the photopolymer as a layer by pouring and precuring it by means of weak UV light action or thermal treatment.

Figure 3:
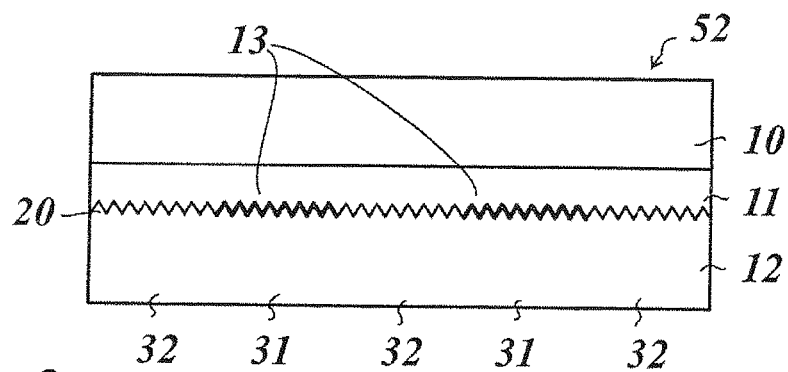
FIG. 3 shows a schematic sectional illustration of a multilayer body which occurs as an intermediate product in the methods according to FIG. 1a to FIG. 1c.

Preferably, in this case the material used for the replication layer 11 is chosen such that the refractive index of the material of the replication layer 11 and the refractive index of the as yet unexposed volume hologram layer are approximately identical or have a difference in refractive index of less than 0.2. This ensures that, during the subsequent exposure, the domains of the surface structure 20 which are still present in the zones 32—as indicated in FIG. 3—are filled with a material having approximately the same refractive index and thus cannot corrupt the recording of the volume hologram in the volume hologram layer 12.

Thus, the following layer is used as replication layer 11, for example:

Replication Layer 11

| | |
|---|---|
| Methyl ethyl ketone | 2100 g |
| Toluene | 750 g |
| Cyclohexanone | 1000 g |
| Acetyl tributyl citrate | 30 g |
| Nitrocellulose (ester-soluble, standard 34 E) | 1000 g |
| Methyl methacrylate-butyl acrylate copolymer ($T_{glass}$ 80° C., $T_{soften}$ ca. 120° C.) | 180 g |

$T_{glass}$ = glass transition temperature;
$T_{soften}$ = softening temperature Furthermore, it is also possible to provide, in addition to the layer 13, an HRI (high refractive index) layer having a high refractive index, for example consisting of ZnS, which covers the surface structure 20 preferably over the whole area. This additional layer can be applied to the film body before or after the shaping of the layer 13.

Figure 4:
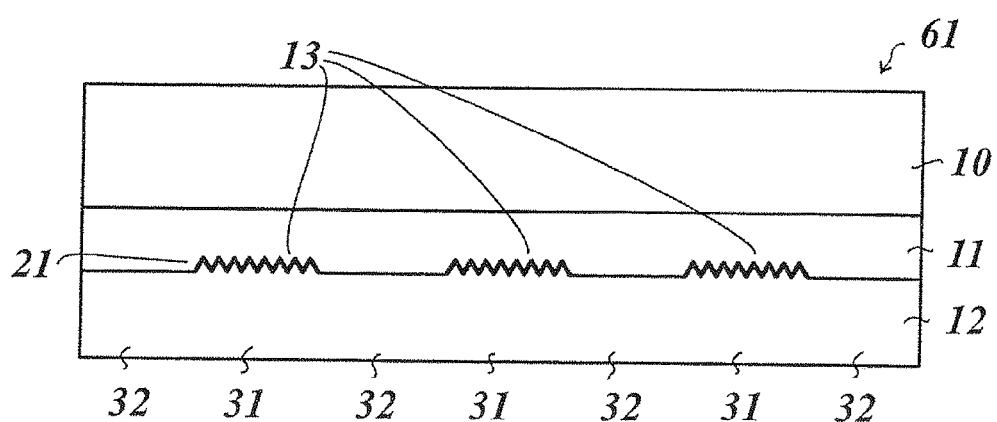
FIG. 4 shows a schematic sectional illustration of a multilayer body that forms an intermediate product in a further exemplary embodiment of the invention.

FIG. 4 shows a multilayer body 61, likewise having a carrier layer 10, a replication layer 11 and a volume hologram layer 12, which are formed in the manner explained above with reference to FIG. 2 and FIG. 3. In contrast to the multilayer body 52, in the case of the multilayer body 61, a relief structure molded into the replication layer 11 only in the zones 31, rather than over the whole area, is molded into the replication layer 11. Furthermore, is also possible for the domains in which the relief structure is molded into the replication layer 11 and the zones 31 in which the metallic layer 13 is provided to be designed with regard to their dimensions such that, in the case of the register deviations that occur in registration methods used in the production process between the demetallization process and the replication process, it is ensured that the relief structure 21 is molded in the zones 31. For example by the dimensioning of the domains provided with the relief structure 21 being enlarged relative to the zones 31 by the register deviation or by double the register deviation. Furthermore, it is also possible for the zones 31 to be provided with the relief structure 21 only in certain domains, and, for example, for the domains in which the relief structure 21 is provided to be chosen in pattern form independently of the shaping of the zones 31.

Figure 5:
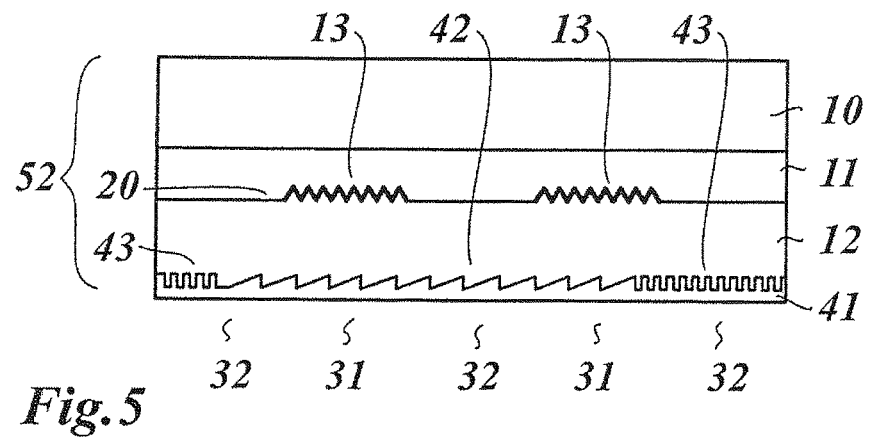
FIG. 5 shows a schematic sectional illustration of a multilayer body which occurs as an intermediate product in the methods according to FIG. 1a to FIG. 1c.

The multilayer body 52 described in FIG. 3 is then fed to the exposure station 40. The exposure station has a volume hologram master 41 attached to the surface of an exposure roller. In this case, the underside of the multilayer body 52 bears on the surface of the exposure roller, thus resulting in the arrangement shown in FIG. 5: the volume hologram master 41 with surface structures 43 and 42 is in direct contact with the still soft material of the volume hologram layer 12. Furthermore, it is also possible here to provide a transparent spacer layer between the volume hologram master and the multilayer body 52 in order thus to improve the service life of the master, for example.

Furthermore, is also possible for the volume hologram master used not to be a master provided with a surface relief, but rather a volume hologram, and for the recording of the volume hologram in the volume hologram layer to be effected by means of a customary holographic copying method for forming a transmission or reflection hologram in the volume hologram layer.

Furthermore, it is also possible for the volume hologram master not to be attached on an exposure roller, as shown in FIG. 3, and for the exposure not to be effected in a continuous roll-to-roll process, but rather for the exposure to be effected section by section in a "step-and-repeat" process.

The structures described in DE 10 2006 016 139, for example, can be used as relief structure 42 and 43, wherein the structures 43 are moth eye structures, for example. With regard to the details of the exposure method, reference is likewise made to said document.

Figure 6:
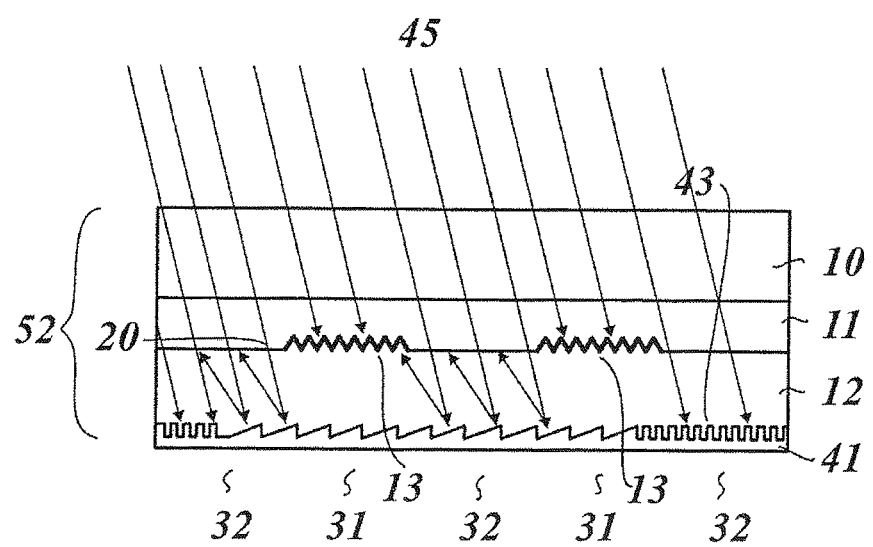
FIG. 6 shows a schematic sectional illustration of a multilayer body which occurs as an intermediate product in the methods according to FIG. 1a to FIG. 1c.

If the volume hologram layer is then irradiated by means of a laser 44 with coherent light 45 for the purpose of writing the volume hologram predetermined by the structures 42 and 43 into the volume hologram layer 12, then the effect shown in FIG. 6 arises: the incident light 45 is reflected by the metallic layer 13 in the zones 31 and does not penetrate into the underlying volume hologram layer 12. Preferably, the coherent light 45 is in this case radiated in at an angle of incidence of approximately 15 degrees with respect to the normal to the top side of the multilayer body 52. In the zones 32, the light 45 penetrates through the volume hologram layer 12 and is diffracted back by the underlying surface relief of the volume hologram master 41, as a result of which, in the zones 32, an interference pattern forms from the superimposition of the incident and diffracted-back light rays in the volume hologram layer 12. This interference pattern is then recorded in the volume hologram layer 12.

The volume hologram is therefore written into the volume hologram layer 12 in the zones 32 and only in the edge domains of the zones 31. The writing of the volume hologram into the core domain of the zones 31 is prevented by the partial metallic layer 13.

In this case, it is possible to use two or more lasers, preferably operating in a scanning fashion, the emitted coherent light from which is incident at different angles of incidence in the volume hologram layer 12. This is shown by way of example in FIGS. 1b and 1c. In this case, the angles of incidence of the lasers can lie in a plane which is arranged approximately perpendicular to the cylinder axis of the cylindrical volume hologram master 41 in FIGS. 1b and 1c, or else lie in a plane which is arranged approximately parallel to the cylinder axis of the cylindrical volume hologram master 41 in FIGS. 1b and 1c.

Figure 1B:
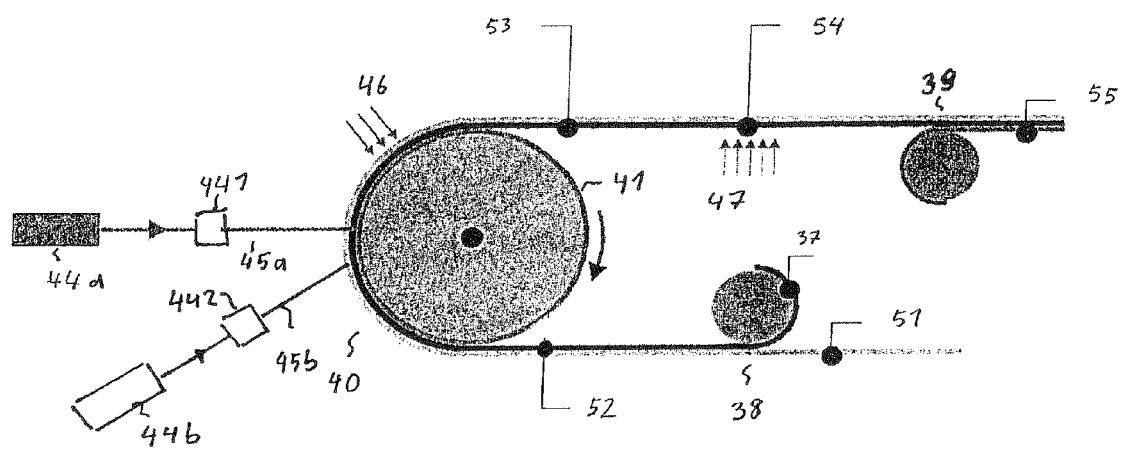

FIG. 1b illustrates a method in which two lasers are used, which are arranged such that the coherent light emitted by them is incident at different angles of incidence in the volume hologram layer 12. The method according to FIG. 1b thus corresponds to the method according to FIG. 1a with the difference that two lasers 44a and 44b are provided instead of the laser 44, wherein the coherent light 45a and 45b respectively generated by said lasers 44a and 44b is incident at different angles on the volume hologram layer 12. Furthermore, a respective modulator 441 and 442 is arranged in the beam path between the lasers 44a and 44b and the volume hologram layer 12 in order to control the coherent light 45a and 45b, respectively, which is incident on the volume hologram layer 12, as is explained in greater detail further below. In this case, the modulator 441 and/or 442 is an optional element. Without modulator 441 and/or 442, the laser can expose the volume hologram layer 12 over the whole area or the laser is modified with the aid of masks (not illustrated in more specific detail) or else regulated laser-internally.

The lasers 44a and 44b can emit coherent light 45a, and 45b, respectively, having identical or different wavelengths.

As a result, a multicolored image can arise in the volume hologram layer 12 because the laser beam impinges on the photopolymer at a respectively different angle or passes through said photopolymer at a respectively different angle and thereby produces differently extending Bragg planes that are responsible for the optical image. Depending on the variation of the angle of incidence and/or of the laser light wavelengths, different colors of the optical image or of the optically perceptible effect are produced.

Proceeding from a predefined arrangement of photopolymer material and volume hologram master with predefined structures and coherent light having a predefined color/wavelength, a variation in the wavelength of the light color of the optically perceptible effect arises upon variation of the angle of incidence of the coherent light with respect to the normal to the top side of the multilayer body 52. If the angle of incidence is increased, for example, that is to say if the coherent light is radiated with flatter incidence with respect to the top side of the multilayer body 52, the wavelength of the light color of the optically perceptible effect shifts into the longer-wave range because the path of the beam in the material layer of the photopolymer becomes longer in the case of flatter incidence. By way of example, a yellowish-green light color (with a longer wavelength than green) of the optically perceptible effect can be obtained by increasing the angle of incidence of green coherent light or a bluish-green (with a shorter wavelength than green) light color of the optically perceptible effect can be obtained by decreasing the angle of incidence of green coherent light.

With a predefined volume hologram master and a plurality of lasers with differently colored coherent light, by means of the variation of the angle of incidence of the coherent light it is also possible to influence whether or not the optically perceptible effect is dependent on viewing angle. If differently colored coherent light is radiated in at approximately identical angles of incidence, a multicolored optically perceptible effect arises which, however, is dependent on viewing angle and exhibits only one of the resulting colors in each case, depending on the viewing angle. If all of the generated colors are intended to be visible simultaneously, that is to say at one and the same viewing angle, the angle of incidence of the individual colors of the coherent light has to be varied accordingly, in which case it holds true that the higher the wavelength of the incident coherent light, the lower the required angle of incidence relative to the normal to the top side of the multilayer body 52. Also conceivable in this case is an angle of incidence of approximately 0 degrees in the case of long-wave red light, e.g. approximately 15 degrees in the case of green light (medium wavelength range of the visible spectrum) and approximately 30 degrees in the case of short-wave blue light. The perceptible optical effect composed of red, green and blue portions would then be visible at a common viewing angle or else at a common viewing angle range.

As an alternative thereto, it is possible to use two or more lasers, preferably operating in a scanning fashion, which emit coherent light having different wavelengths and the beams of which are coupled to one another by means of a coupler based on polarization or reflection (e.g. two prisms adhesively bonded together at their bases) such that the coupled beams of all the lasers are incident at a common angle of incidence in the volume hologram layer 12.

Figure 1C:
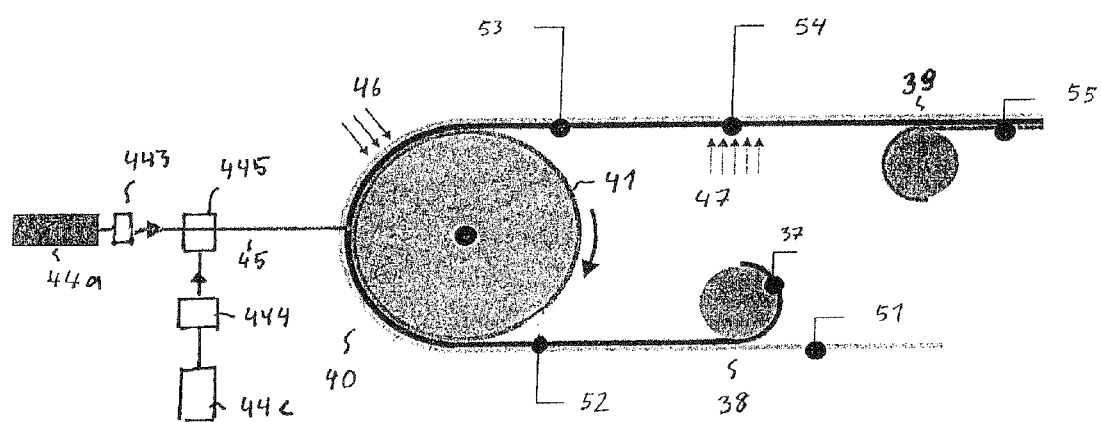

A method in which the volume hologram layer 12 is exposed by means of an exposure arrangement arranged in this way is shown by way of example in FIG. 1c. The method in accordance with FIG. 1c corresponds to that in accordance with FIG. 1a with the difference that, instead of the exposure by the laser 44, the exposure of the volume hologram layer 12 is effected by an exposure arrangement consisting of two lasers 44*a* and 44*c*, two modulators 443 and 444 and a coupler 445. The lasers 44*a* and 44*c* generate coherent light having different wavelengths which is coupled by means of the coupler 445 and radiated as light 45 onto the volume hologram layer 12. The exposure of the volume hologram layer 12 by means of the two lasers 44*a* and 44*c* can be controlled simply and rapidly via a driving of the coupler 445.

In order to form an image with this coupled or combined light beam, it is advantageous if the light beam intensity is modulated, for example by individual partial beams being switched on and off (binary modulation). Specific lasers (e.g. diode lasers) can be modulated directly. Other lasers can be modulated at a sufficiently high speed by means of external modulators, for example the modulators 443 and 444, e.g. by means of acousto-optical or electro-optical modulators. It is also possible to produce a modulation by means of a shutter or chopper or to modulate the laser beams individually or jointly by means of masks or diaphragms.

Preferably, the arrangements according to FIG. 1*b* and FIG. 1*c* have a sensor element and a control unit. The sensor element detects the position of the volume hologram master. For this purpose, it either senses the surface of the cylinder 41 optically or detects the angular position of the cylinder 41 by means of a rotary encoder. The control unit uses the position of the volume hologram master determined directly or indirectly by the sensor element as an input parameter for driving the lasers 44*a*, 44*b*, 44*c* and/or the modulators 441 to 444. In this case, these components are driven by the control unit on the basis of the measured values determined by the sensor element and on the basis of the predefined color value distribution of the multicolor volume hologram such that the exposure of the volume hologram master is effected by light having different wavelengths or light having different angles of incidence such that it is effected in register with the predefined color values of the multicolor volume hologram. With the aid of the sensor element it is likewise possible to detect the position of the multilayer body 52 with the volume hologram layer 12, for example by means of optical register marks applied on the multilayer body 52, and thereby to drive the lasers 44*a*, 44*b*, 44*c* and/or the modulators 441 to 444 such that an exposure of the volume hologram master can be effected with register accuracy or in register with design elements already present on the multilayer body 52.

Figure 12A:
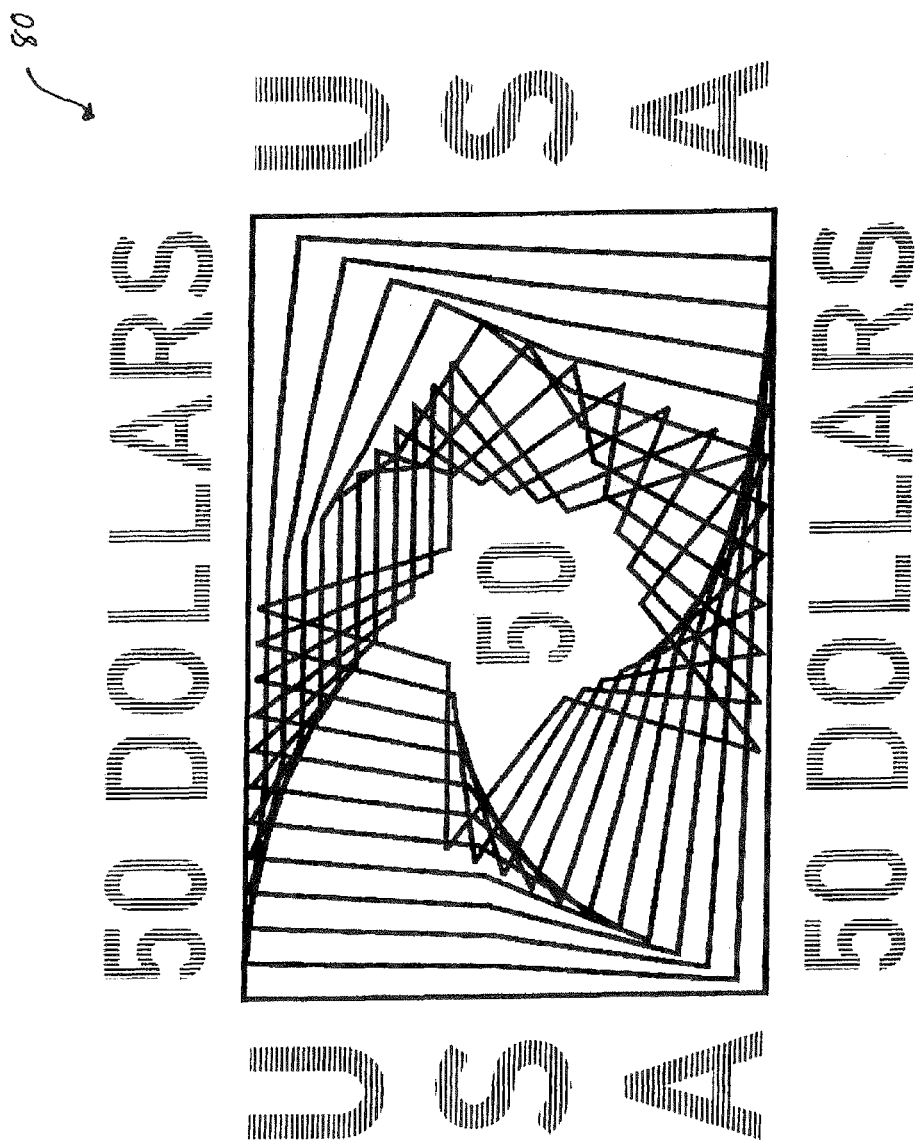
FIG. 12a shows an illustration of an optical information item provided by a film body according to the invention.

FIG. 12*a* illustrates the optical impression 80—which arises for an observer—of one possible embodiment of a multicolor volume hologram, produced in accordance with FIG. 1*b* or FIG. 1*c*. The number "50" and the characters "50 DOLLARS" appear red. The lines surrounding the "50" exhibit an optical effect of apparently moving morphing or cross-fading from a green rectangle to a green star when the element is horizontally tilted/moved. The characters "USA" appear blue.

Figure 12B:
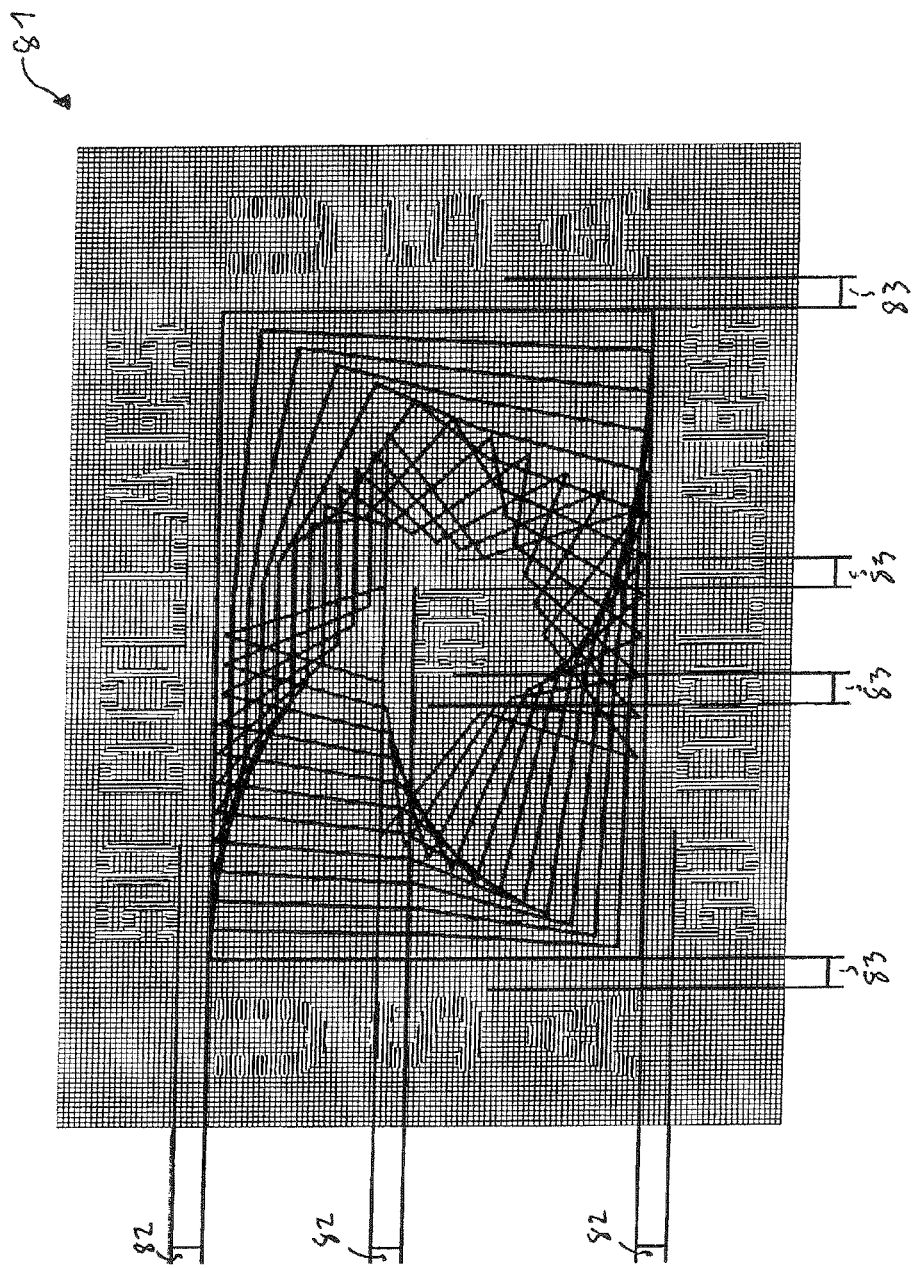
FIG. 12b shows a schematic plan view of a volume hologram master.

FIG. 12*b* shows a volume hologram master 81 used for writing the volume hologram. The background is formed by black mirror structures or moth eye structures (non-image-generating) and the design elements are produced with diffractive structure types that are different therefrom. The morphing from a green rectangle to a green star is produced e.g. by the same structures having a varying azimuth. The red and blue elements "50", "50 DOLLARS" and "USA" can have a structure different therefrom, but jointly identical, including with the same azimuth, e.g. 0 degrees. The design elements have a distance 82, 83, which has to be greater than the necessary tolerance in the positioning of the laser beam on the master.

Figure 12C:
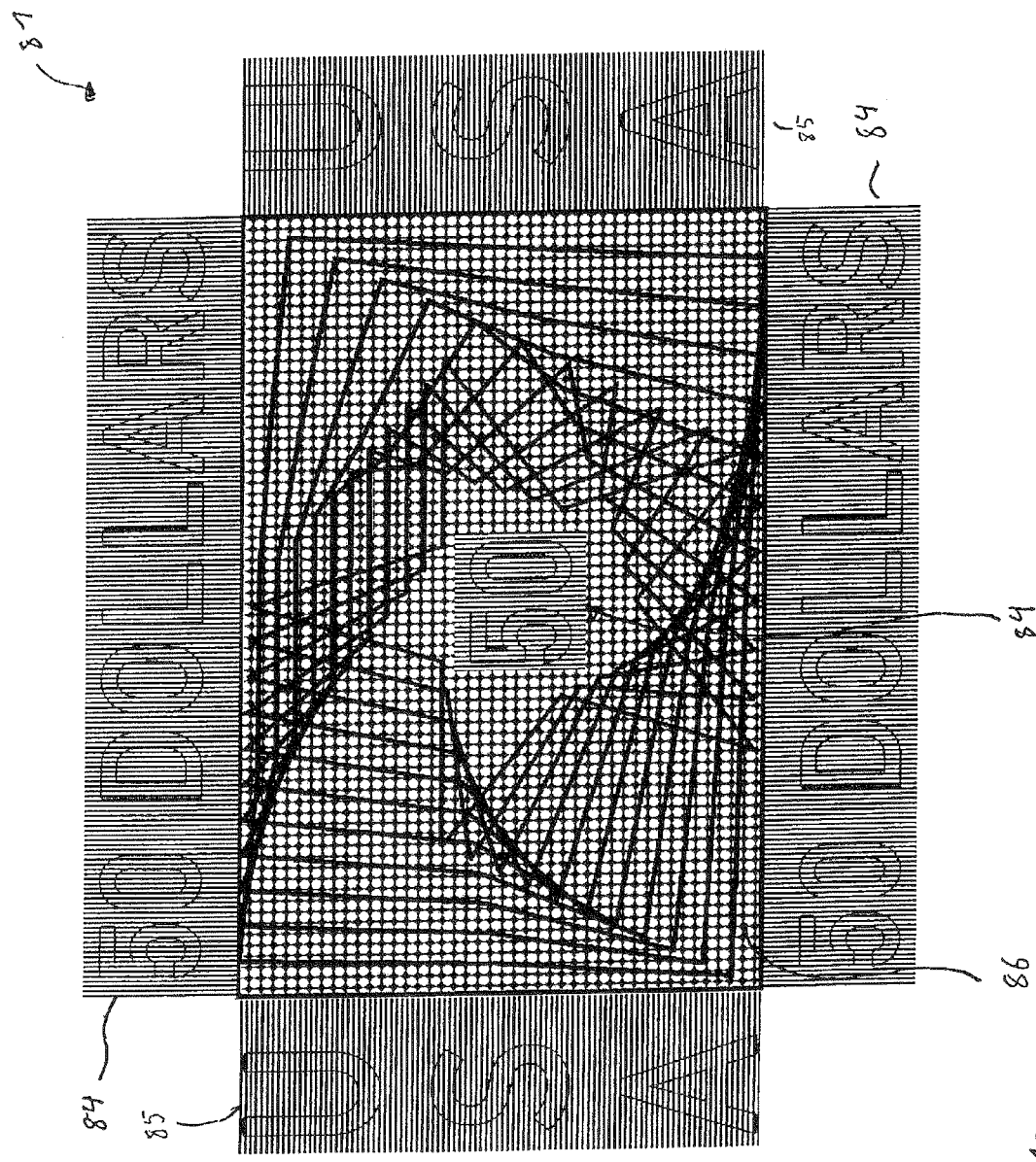
FIG. 12c shows a schematic plan view of a volume hologram master with a plurality of exposure domains.

FIG. 12*c* shows the volume hologram master 81 and the regions of the volume hologram master 81 which are irradiated by means of differently colored lasers. A first laser, which emits red light, at a first angle of incidence irradiates the regions 84, which produces red design elements. A second laser, which emits green light, irradiates the region 86, which produces green design elements. A third laser, which emits blue light, irradiates the regions 85, which produces blue design elements. The angles of incidence of the differently colored lasers can be identical or different in each case. Instead of differently colored lasers, in this example, too, it is also possible to use lasers having the same color, but with a different angle of incidence per region 84, 85, 86 with respect to the surface of the volume hologram master 81.

Multicolored volume holograms can be produced in this way. In the case of a volume hologram master 81 having a correspondingly fine grid structure with closely adjoining domains (pixels) of different colors (e.g. RGB), it is also possible, by means of additive color mixing, to produce true color holograms based on the color mixing of the intermeshing grids of the individual colors. For this purpose, the volume hologram master 81 can have a homogeneous, uniform structure which is irradiated in each case with coherent light having different colors and/or at different angles of incidence. For this purpose, however the volume hologram master 81 can also have a homogeneous, uniform structure only in certain domains. Furthermore, in the exposure station 40, the film body 52, after the writing of the volume hologram, is additionally exposed with UV light 46 from the side of the top side of the multilayer body 52 in order at least partly to cure the photopolymer of the volume hologram layer and to fix the Bragg planes of the volume hologram layer. This exposure is preferably effected using a non-collimated UV light source, such that a largest possible domain of the domains of the volume hologram layer 12 which are arranged below the partial metallic layer 13 is cured by the irradiation. Exposure using collimated UV light is also possible.

The resultant multilayer body 53 is then fed to the exposure station 54, in which the multilayer body 53 is exposed with UV light from the underside and the remaining, not fully cured domains of the volume hologram layer are thus fully cured as well.

Figure 7:
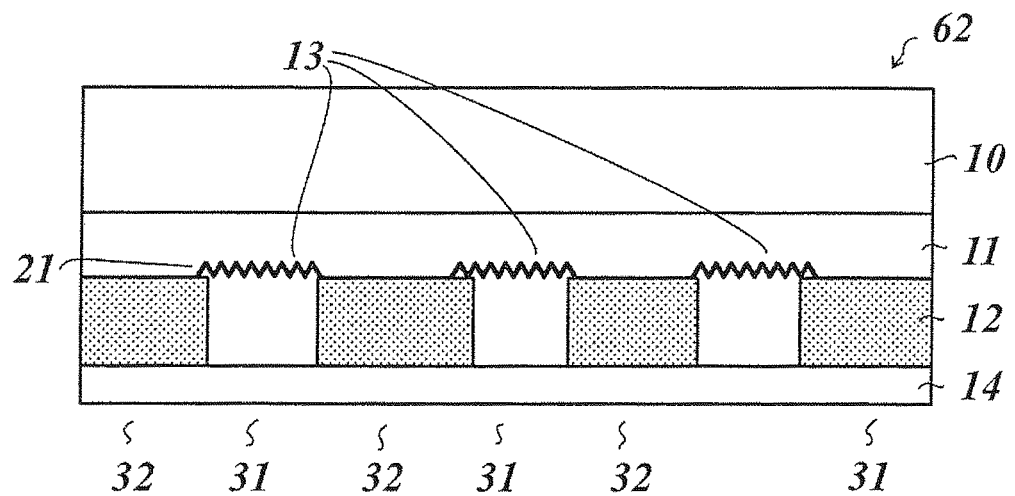
FIG. 7 shows a schematic sectional illustration of a multilayered film body.

FIG. 7 then illustrates the construction of a security element 62 which has been produced by the methods described above. The security element 62 has the carrier layer 10, the replication layer 11, the partial metallic layer 13, the volume hologram layer 12 and an adhesive layer 14. In this case, the adhesive layer 14 can also be colored and preferably has a dark pigment. Preferably, the adhesive layer 14 is colored black in this case or a black interlayer is provided between the volume hologram layer 12 and the adhesive layer 14. The adhesive layer 14 can also be dispensed with or in addition or instead of the adhesive layer 14, one or a plurality of further layers, for example a further metallic layer and/or a decorative layer, can also be provided. Thus, it is also possible, for example, for a decorative layer, for example color layer, shaped in pattern form to be applied to the volume hologram layer before the adhesive layer 14 is applied. In this case, the decorative layer is preferably printed on by means of a printing method, for example in the form of a logo or a pattern. The decorative layer can also be applied before the application of the security element 62 onto a substrate (not illustrated in more specific detail), preferably printed on by means of a printing method, for example offset printing, flexographic printing or screen printing, for example in the form of a logo or a pattern. The security element 62 can then be applied in particular with register accuracy with respect to the decoration on the substrate.

In this case, the decoration can consist of conventional printing inks, but also of special security colors or security inks which contain, in particular, special pigments that produce optically variable effects, for example Merck Iriodin effect pigments.

The metallic layer 13 is provided in the zones 31 of the security element 62 and not provided in the zones of the security element 62. As shown in FIG. 7, the relief structure 21 is furthermore molded in the zones 31. In the domains 32, the relief structure is cancelled by the coating with the material of the volume hologram layer or not actually molded into the replication layer 11 in the first place, as has been explained above. In the zones 32, a volume hologram is written into the volume hologram layer, wherein the domains in which the Bragg planes of the volume hologram are formed in the volume hologram layer 12 are correspondingly identified in FIG. 7. In the zones 31, in this case domains are provided in which no volume hologram is written into the volume hologram layer 12, as has already been explained above. By means of the relief structure 21 covered with the metallic layer 13, a first optically variable information item is provided in the domains 31. In the domains 32, instead of said first information item, a second optically variable information item different therefrom is provided by the volume hologram written into the volume hologram layer 12 in the zones 32. In the zones 31 and 32, therefore, different optical effects are generated, which are generated without a boundary domain directly alongside one another, such that no superimposition phenomena that disturb or corrupt said effects occur in the boundary domains. Furthermore, it is possible for the zones 31 to be provided alternately and for first zones that succeed one another in at least one direction to be spaced apart from one another by less than 300 μm. Such an arrangement of the zones 31 and 32 is illustrated by way of example in FIG. 8.

Figure 8:
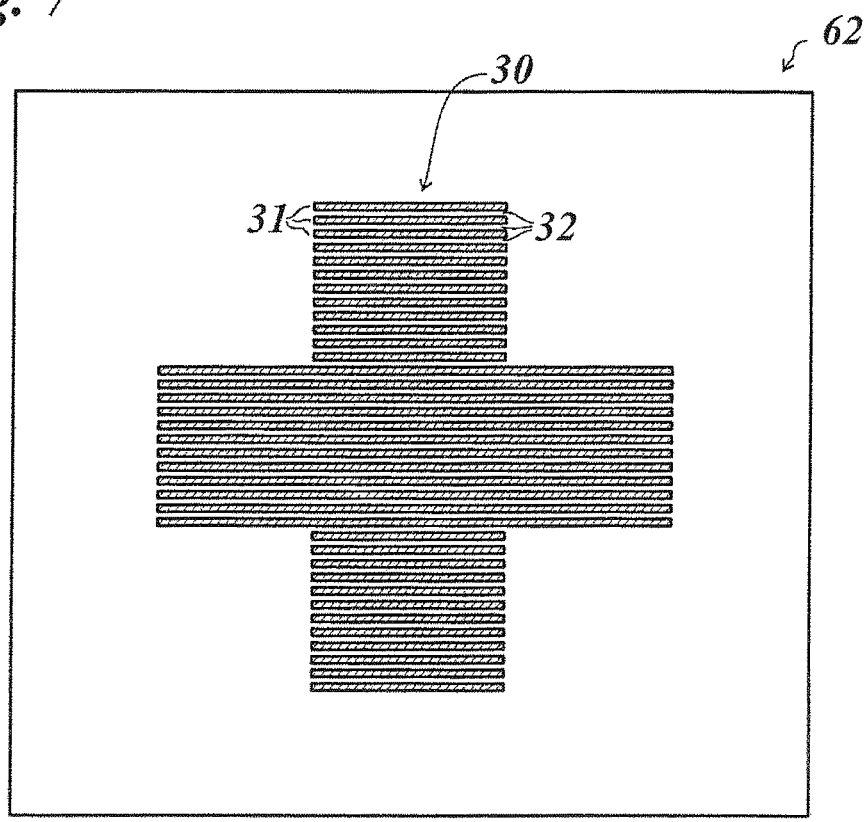
FIG. 8 shows a schematic, enlarged plan view of the security element according to FIG. 7.

FIG. 8 shows a schematic, greatly enlarged plan view of a domain of the security element 62. In a domain 30 of the security element 62, the zones 31 and 32 are arranged in accordance with a regular, one-dimensional periodic grid. The width of the zones 31 is in the range of approximately 100 μm and the distance between successive zones 31 is approximately 240 μm. The length of the zones 31 is chosen here such that the domain 30 having this arrangement of zones 31 and 32 is shaped in pattern form in the form of a cross. By virtue of such a configuration of the zones 31 and 32, an optically variable impression resulting from the superimposition of the first and second optically variable information items, for example a metallic cross 31 and a number 32, arises for the human observer in the domain 30.

Diverse interesting optical effects can also be obtained by the zones 31 and 32 not being arranged in accordance with a periodic grid. Preferably, the zones in this case have a width of less than 300 μm, preferably a width of 150 to 50 μm, and are shaped in the form of thin lines having a length of >300 μm. These lines are furthermore shaped in the form of complex patterns, for example in the form of a guilloche or for representing a pictorial representation, for example a portrait. Furthermore, it is also possible for the first zones 31 to shape a repetitive pattern, for example in the form of a repeating number or a repeating logo.

In one embodiment variant, the replication layer has diffractive structures arranged alongside one another, preferably completely or partially metallized (or partially covered with other reflection layers) as described above, and valleys of a refractive, macroscopic structure, which are filled with the photopolymer material 37 and thereby form a partial volume hologram layer 12. If a multilayer body 52 constituted in this way is exposed in the exposure station 40 by means of the laser 44 with coherent light 45 and the volume hologram master 41 and subsequently cured, the interference pattern of the volume hologram arises only in the domains in which the photopolymer material 37 is present in a layer thickness sufficient for this purpose. No volume hologram is produced in the other domains. As a result, it is possible to combine domains having metallized reflection holograms which lie alongside one another with register accuracy with domains having volume holograms which are arranged adjacent thereto. Likewise, it is thus possible for the partial domains which are filled with the photopolymer material 37 to be arranged as dots in a regular or irregular grid, wherein the grid is preferably so fine that it cannot be resolved by the human eye. By way of example, such a grid has a resolution of 300 dpi (dots per inch) or higher. It is only within these volume hologram dots that an interference pattern of the volume hologram is produced, and hence an optically variable effect. Outside the dots of the grid, a different optical effect or else no optical effect is visible as contrast. Consequently, it is possible for the image information contained in the volume hologram master 41 to be reproduced only partly in the volume hologram layer 12 or for the image information contained in the volume hologram master 41 to be superimposed with further image information in the form of the shaping of the domains filled with photopolymer material 37.

This will be explained below with reference to FIGS. 9*a* to 11*b*.

FIG. 9*a* shows a film body 91 having the carrier layer and the replication layer 11, which are formed in the manner described above with reference to FIGS. 1*a* to 8. In this case, a relief structure 22 is molded into the replication layer 11, which relief structure has a relief depth of more than 10 μm, preferably between 20 and 50 μm, in first regions 71 and has a relief depth of less than 1 μm, in this exemplary embodiment a relief depth of 0, in second regions 72.

A photopolymer present in liquid form is then applied to the underside of the film body 91 as volume hologram material—as described above for example in the exemplary embodiments according to FIGS. 1*a* to 8. A photopolymer corresponding to the photopolymer 37 described above can be used as volume hologram material. Preferably, the volume hologram material is introduced into the depressions of the relief structure by means of a doctor blade, thus resulting in the film body shown in FIG. 9*b*, wherein the relief structure 22 is filled with the volume hologram material in the regions 71. However, it is also possible to dispense with introducing the volume hologram material by doctor blade if the volume hologram material is chosen with a correspondingly low viscosity, such that the volume hologram material, after application, penetrates, in particular flows, into the depressions substantially independently. Furthermore, it is also possible for the volume hologram material to be present not only in the regions 71, but also in the regions 72, wherein it is essential here for the layer thickness of the volume hologram layer thus present to be at least 10 μm thicker in the regions 71 than in the regions 72.

Afterward, as described above with reference to FIGS. 1*a* to 8, a volume hologram is written into the volume hologram layer 12 partially present in the regions 71, and the volume hologram material of the volume hologram layer 12 is then cured and the volume hologram is thus fixed. With regard to the details of this part of the method, reference is made to the explanations concerning FIGS. 1*a* to 8, that is to say that this part of the method is carried out in a manner corresponding to that described with reference to FIGS. 1a to 8.

In the regions 71, the relief structure 22 preferably has a relief depth of between 10 and 50 µm, with further preference between 15 and 40 µm. The width of the regions 71, that is to say the smallest dimension thereof, is preferably more than 20 µm. The regions 71 can be shaped in accordance with the zones 32 according to FIG. 2 to FIG. 8. Furthermore, it is also possible for the zones 72 to be chosen such that their smallest dimension is less than 400 µm, preferably less than 200 µm and that the area proportion constituted by the zones 71 in the domain of the volume hologram is varied in order in this way, in addition, for the brightness of the volume hologram as it appears to the observer additionally to be varied. In this case, it is possible, firstly, for the regions 71 to be formed substantially uniformly, for example to have the form of a point or of a polygon, and for the distance between the regions 71 to be varied locally, as a result of which a different area occupancy of the domains by the regions 71 arises in adjacent domains. Furthermore, it is also possible for the regions 71 to be arranged in a regular grid and for the regions 71 to vary in terms of their size, that is to say for the area occupied by them to vary.

Furthermore, it is also possible for the regions 71 to be formed in the form of fine lines having a line width in the range of between 20 µm and 400 µm, preferably 75 µm to 200 µm, particularly preferably between 30 µm and 60 µm. By virtue of such a configuration of the regions 71 it is possible to create a security element which can be counterfeited only with difficulty. Such a security element cannot be copied by means of the partial writing of a volume hologram, nor can it be obtained by means of printing methods, etc., on account of the customary properties of volume hologram material, with the result that an impressive security feature which can be counterfeited only with very great difficulty is provided. Preferably, the fine lines in this case represent pictorial information, for example a portrait or a numeric code. It is furthermore also advantageous to form the lines in the form of a security pattern, for example in the form of a guilloche or a Moiré pattern.

FIG. 10a to FIG. 10c illustrate the production of a further security element according to the invention.

FIG. 10a shows a film body 93 having the carrier layer 10 and the replication layer 11. A relief structure 23 is molded into the replication layer 11.

The relief structure 23 differs from the relief structure 22 according to FIG. 9a in that structure elements having a relief depth of less than 2 µm, in particular less than 1 µm, which are suitable for generating an optically variable effect, are molded in the regions 72. The relief structure in the regions 72 thus forms for example a relief structure formed like the relief structure 20 and/or 21 according to FIG. 2 to FIG. 8.

That surface of the replication layer 11 which is provided with the relief structure 23 is then provided with a metallic layer, the metal layer 13, in a portion of the regions 72 or in partial regions of the regions 72, which metal layer is thus present in zones 31 and is not present in zones 32, as already explained above with reference to FIGS. 2 to 8.

This can be realized by the metal layer 13 being applied by means of a vapor deposition mask only in the regions 72, or by the surface of the relief structure 23 being provided with a metallic layer over the whole area and the metal layer then being removed again in the regions 71 and in the regions 72 in which the fine structure formed by the structure elements is not provided.

This can be effected for example by printing on an etchant/etching resist.

This results in a film body 94 in which the metallic layer 13 is not provided in the regions 71 and the metallic layer 13 is provided in all or a portion of the regions 72 or in partial regions of the regions 72.

Afterward, the volume hologram material is applied to the underside of the film body 94, that is to say that side of the film body 94 which is provided with the partial metal layer, as already explained above with reference to FIG. 9b, a volume hologram is written and the volume hologram material is crosslinked, thus resulting in the film body shown in FIG. 10c. This film body exhibits the same optical appearance as, for example, the film body according to FIG. 7a and FIG. 8 with the difference that, in the zones 32, the luminous intensity of the volume hologram is additionally varied by the configuration of the regions 71, as explained above.

Figure 10D:
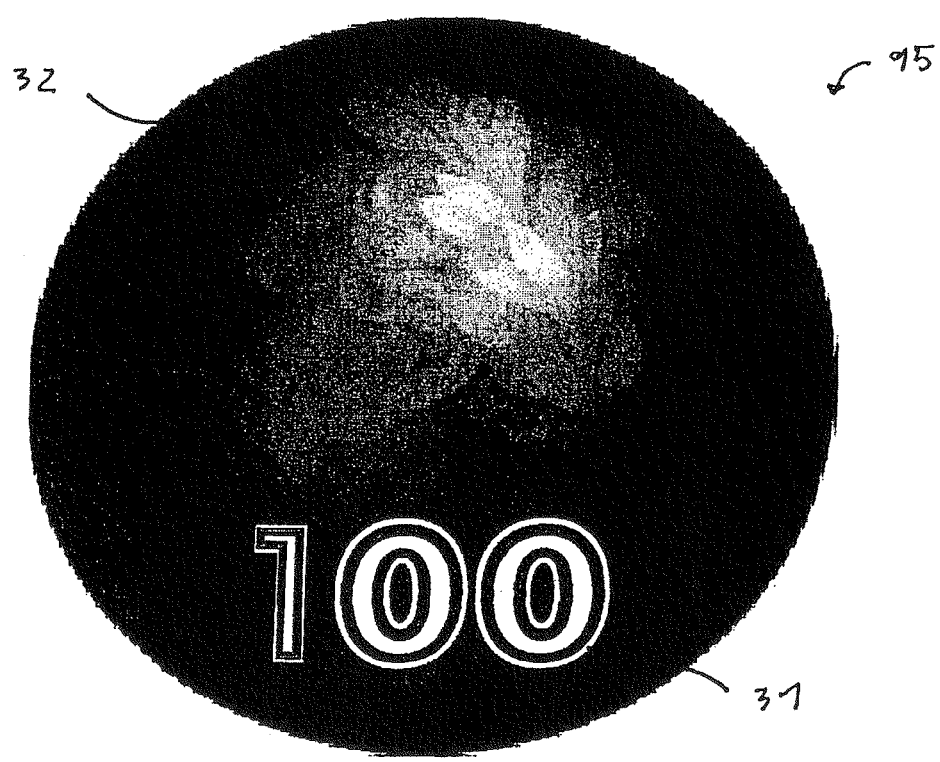
FIG. 10d shows an illustration of an optical information item provided by a film body according to the invention.

FIG. 10d thus shows by way of example one possible optical appearance of the film body 95, in which a volume hologram with varying luminous intensity in the form of a portrait is manifested in a zone 32 coated with photopolymer and a Kinegram® shaped in the form of the numbers "100" with contours is manifested in a zone 31 free of photopolymer, said zone being formed as gaps in the zone 32. By virtue of the structures for forming the zones 31 and 32, said structures being produced with the same volume hologram master, the Kinegram® in the zone 31 is arranged with register accuracy and, as shown in FIG. 10d, closely adjacent and with uniform distance relative to the edge of the zone 32, which is difficult to counterfeit and results in a security element which is difficult to forge. In this case, as described above, the zone 32 with a volume hologram can consist of a grid of small regions with photopolymer, that is to say of photopolymer applied partially in grid form, the local grid width producing the local brightness value of the volume hologram. It is likewise possible for the zone 32 with a volume hologram to consist of photopolymer which is applied over the whole area in said zone 32 and into which a motif is exposed.

A further possibility for producing a film body according to the invention is explained below with reference to FIGS. 11a and 11b.

FIG. 11a shows a film body 96 having the carrier layer 11 and the replication layer 13. The film body 96 is constructed like the film body 91 according to FIG. 9a with the difference that, instead of the relief structure 22, a relief structure 24 is molded into the underside of the replication layer 11 and all regions 72 are covered with the metallic layer 13. The relief structure 24 is formed like the relief structure 23 according to FIG. 10a with the difference that all regions 72 are occupied by structure elements which generate an optically variable information item. This is not mandatory, however. In this case, the following methods are preferably used for producing the partial metal layer 13: the underside of the replication layer 13 with the relief structure 24 is coated with a metallic layer over the whole area, for example by vapor deposition and sputtering. An etching resist is subsequently applied by means of a printing roller. On account of the relatively high difference in the relief depth between the regions 71 and 72, the printing roller only wets the "elevated" regions 72 with the etching resist, such that the etching resist is applied to the regions 72 with register accuracy without an additional measure. The metal layer is subsequently removed in the domain not protected by an etching resist, in an etching process. Furthermore, it is also possible for the relatively large difference in the relief depth in the regions 71 and 72 to be utilized to the effect that an etchant is applied and introduced by doctor blade into the regions 71, such that the metal layer is removed by the etchant in the regions 71, but not in the regions 72.

FIGS. 10b, 10c and 11a, 11b in each case illustrate the case in which the relief structure 23, 24 is completely covered with the metal layer 13. It is likewise possible for the metal layer 13 to only partly cover the relief structure 23, 24, for example in the form of an areal grid or as a partial metal layer 13 in register with a molded design in the relief structure 23, 24.

Afterward, the film body 96, as explained above in accordance with FIG. 9b, is coated with a volume hologram material, a volume hologram is written into the volume hologram layer thus formed, and the volume hologram material is then cured and the volume hologram is thus fixed. This results in the film body 97. As already noted above, it is not necessary in this case for the volume hologram layer 12 not to be present in the regions 72. As shown in FIG. 11b, it suffices if the volume hologram layer 12 has a layer thickness of preferably less than 5 µm in the regions 72.

The invention claimed is:

1. A security element in the form of a multilayered film body having a top side facing an observer and having a volume hologram, which provides a first optically variable information item, wherein the security element has a replication layer, in the surface of which a relief structure is molded, which has a relief depth between 10 µm to 50 µm in one or a plurality of first regions and has a relief depth between 0 to 2 µm in one or a plurality of second regions, and wherein the relief structure is filled with a volume hologram material in the first regions of the replication layer, the volume hologram being recorded in said volume hologram material.

2. The security element as claimed in claim 1, wherein the layer thickness in which the volume hologram material is provided in the first regions differs from the layer thickness with which the volume hologram material is provided in the second regions by at least 8 µm.

3. The security element as claimed in claim 1, wherein, in the second regions, substantially no volume hologram material is provided.

4. The security element as claimed in claim 1, wherein the volume hologram material provided in the first regions forms a partial volume hologram layer in which the volume hologram is written.

5. The security element as claimed in claim 1, wherein the first regions have a smallest dimension of between 20 µm to 400 µm.

6. The security element as claimed in claim 1, wherein the area proportion constituted by the first regions in the area of at least one first domain of the security element differs from the area proportion constituted by the first regions in the area of at least one second domain of the security element.

7. The security element as claimed in claim 6, wherein first and second domains are arranged for varying the brightness of pixels of the volume hologram.

8. The security element as claimed in claim 6, wherein the first regions are arranged in a one- or two-dimensional grid, and wherein the grid width and/or the area occupied by the respective first regions differs in the at least one first domain of the security element from the grid width and/or the area occupied by the respective first regions in the at least one second domain of the security element.

9. The security element as claimed in claim 1, wherein the relief structure has, in the second regions or in partial regions of the second regions, structure elements providing a second optically variable information item.

10. The security element as claimed in claim 9, wherein the structure elements within the second region or the partial regions of the second regions form a diffractive structure, a refractive structure or a matt structure.

11. The security element as claimed in claim 1, wherein a metallic layer is provided in the second regions or in partial regions of the second regions, and the metallic layer is not provided in the first regions.

12. A method for producing a security element in the form of a multilayered film body having a top side facing the observer, wherein a multilayer body comprising a replication layer is provided, wherein a relief structure is molded into the surface of the replication layer, said relief structure having one or a plurality of first regions having a relief depth of the relief structure between 10 µm to 50 µm and one or a plurality of second regions having a relief depth of the relief structure between 0 to 2 µm, wherein the first regions of the replication layer are filled with a volume hologram material, and wherein the volume hologram material is exposed for the purpose of recording a volume hologram.

13. The method as claimed in claim 12, wherein the volume hologram material is applied in liquid form on the multilayer body and the volume hologram material is introduced by doctor blade into the relief structure in the first regions.

14. The method as claimed in claim 12, wherein a metallic layer is applied to the multilayer body in the second regions.

15. The method as claimed in claim 14, wherein the metallic layer is applied over the whole area in the second regions.

16. The method as claimed in claim 14, wherein the metallic layer is applied partially in the second regions.

17. The method as claimed in claim 14, wherein, for the purpose of applying the metallic layer, that surface of the multilayer body which has the relief structure is metalized and the metallization is demetallized in the first regions by printing an etching resist onto the second regions or introducing an etchant by doctor blade into the relief structure in the first regions.

18. The method as claimed in claim 12, wherein a volume hologram master is arranged below the volume hologram layer during the exposure.

19. The method as claimed in claim 12, wherein the exposure of the volume hologram master is effected by means of two or more lasers, whereby a multicolored volume hologram is recorded as volume hologram into the volume hologram layer.

20. The method as claimed in claim 19, wherein the light beams generated by the two or more lasers impinge on the volume hologram layer at different angles of incidence.

21. The method as claimed in claim 19, wherein the two or more lasers generate light having different wavelengths.

22. The method as claimed in claim 19, wherein the light generated by the two or more lasers is coupled by means of a coupler in a light beam used to expose the volume hologram layer.

23. The method as claimed in claim 19, wherein each of the two or more lasers is assigned an exposure mask or a modulator, which is arranged in the beam path between the respective laser and the volume hologram layer.

24. The method as claimed in claim 19, wherein the two or more lasers and/or the modulators are controlled by a control device, which detects the position of the volume hologram master by means of a sensor element and, by means of the information thus determined about the relative position of the volume hologram master with respect to the two or more lasers, drives the lasers and/or the modulators for the purpose of recording the multicolor volume hologram.

* * * * *

UNITED STATES PATENT AND TRADEMARK OFFICE
CERTIFICATE OF CORRECTION

PATENT NO. : 8,848,266 B2  
APPLICATION NO. : 13/920273  
DATED : September 30, 2014  
INVENTOR(S) : Tompkin et al.

It is certified that error appears in the above-identified patent and that said Letters Patent is hereby corrected as shown below:

In the specification,

Column 14, line 37: now reads "relief structure is molded"  
should read -- relief structure 21 is molded --

Column 20, line 32: now reads "carrier layer and the"  
should read -- carrier layer 10 and the --

Signed and Sealed this  
First Day of March, 2016

Michelle K. Lee  
*Director of the United States Patent and Trademark Office*